United States Patent
Holm et al.

(10) Patent No.: US 10,373,090 B2
(45) Date of Patent: Aug. 6, 2019

(54) USER-DEFINED WORKFLOWS IN APP-BASED COLLABORATIVE WORKSPACE SYSTEM

(71) Applicant: Citrix Systems, Inc., Fort Lauderdale, FL (US)

(72) Inventors: Christian Holm, Copenhagen (DK); Kenneth Auchenberg, Copenhagen (DK); Andreas Haugstrup Pedersen, Copenhagen (DK); Peter Lacey, Copenhagen (DK); George Sakkis, Copenhagen (DK); Casper Fabricius Pedersen, Copenhagen (DK)

(73) Assignee: Citrix Systems, Inc., Fort Lauderdale, FL (US)

( * ) Notice: Subject to any disclaimer, the term of this patent is extended or adjusted under 35 U.S.C. 154(b) by 966 days.

(21) Appl. No.: 14/283,574

(22) Filed: May 21, 2014

(65) Prior Publication Data

US 2014/0350997 A1   Nov. 27, 2014

Related U.S. Application Data

(60) Provisional application No. 61/825,727, filed on May 21, 2013.

(51) Int. Cl.
*G06Q 10/06* (2012.01)
*G06Q 10/10* (2012.01)
(Continued)

(52) U.S. Cl.
CPC ... *G06Q 10/06316* (2013.01); *G06Q 10/0633* (2013.01); *G06Q 10/103* (2013.01);
(Continued)

(58) Field of Classification Search
None
See application file for complete search history.

(56) References Cited

U.S. PATENT DOCUMENTS

| 2006/0047555 A1* | 3/2006 | Kang ............... G06Q 10/06316 |
| | | 705/7.26 |
| 2006/0069605 A1* | 3/2006 | Hatoun ................. G06Q 10/06 |
| | | 705/7.15 |

(Continued)

FOREIGN PATENT DOCUMENTS

| WO | 2004097696 A1 | 11/2004 |
| WO | 2007056656 A3 | 5/2007 |

OTHER PUBLICATIONS

Supplementary European Search Report for Application No. EP 14731487.6, dated from EPO Feb. 9, 2017, pp. 1-9.

*Primary Examiner* — Stephanie Z Delich
(74) *Attorney, Agent, or Firm* — BainwoodHuang

(57) ABSTRACT

An online collaborative workspace system includes a set of first subsystems and a workflow subsystem. The first subsystems provide a project-oriented social network environment in which system users collaboratively interact with user-defined application objects that store user data and user-determined application functions executed to display the user data and interlink the application objects into project-scale organizations. The first subsystems can include commenting, task and status subsystems. The workflow subsystem includes a workflow builder and a workflow engine. The workflow builder provides a visual interface enabling a user to define custom workflows for the application objects, where a workflow is a cause-effect structure identifying a trigger event that causes the workflow to be executed and defining an action performed on or by an application object in response to the trigger event. The
(Continued)

workflow engine receives system events and executes workflows having corresponding triggers.

21 Claims, 13 Drawing Sheets

(51) Int. Cl.
*G06Q 50/00* (2012.01)
*G06Q 10/00* (2012.01)

(52) U.S. Cl.
CPC ............ *G06Q 50/01* (2013.01); *G06Q 10/00* (2013.01); *G06Q 10/063* (2013.01)

(56) References Cited

U.S. PATENT DOCUMENTS

| | | | |
|---|---|---|---|
| 2006/0074733 A1* | 4/2006 | Shukla | G06F 8/10 717/105 |
| 2007/0208777 A1 | 9/2007 | van Wyk et al. | |
| 2009/0222277 A1 | 9/2009 | Malek et al. | |
| 2010/0153167 A1* | 6/2010 | Kretzschmar | G06Q 10/00 715/229 |
| 2010/0217645 A1 | 8/2010 | Jin et al. | |
| 2010/0305997 A1* | 12/2010 | Ananian | G06F 9/5038 705/7.27 |
| 2011/0153051 A1* | 6/2011 | Bachman | G05B 19/41865 700/96 |
| 2012/0096365 A1* | 4/2012 | Wilkinson | G06F 9/468 715/740 |
| 2013/0124243 A1 | 5/2013 | Johnson et al. | |
| 2013/0332861 A1* | 12/2013 | D'Agnese | G06F 17/30873 715/753 |

* cited by examiner

USER-DEFINED WORKFLOWS IN APP-BASED COLLABORATIVE WORKSPACE SYSTEM

BACKGROUND

The invention is generally related to the field of social networking, and in particular to online collaborative workspace systems. One example of such a system is the Podio® system of Citrix Systems, Inc.

SUMMARY

A collaborative workspace system employs a visual workflow builder that enables end-users with no technical skills to link together causes and effects to model business processes in an open and transparent social context, and in particular in a context of an app platform with user-defined "apps" or custom data structures. In this description the overall system is in some places referred to as the "collaborative workspace system" or "collaboration system", and an example workflow builder and engine are referred to collectively as the "workflow subsystem."

The workflow subsystem works by providing a graphical user interface that allows use of drag and drop to construct workflows. Workflows are based around apps, which are core objects used to store and present data. A workflow has two object types: causes (triggers) and effects (actions). A workflow is designed to have one cause (a trigger), and to have one or multiple effects (actions). Many effects can be combined in a workflow, which can enable a large number of combinations for actions. In addition to causes and effects, it may also be possible to define a set of conditions (single or multiple combined in a chain), so a given set of effects is triggered only if the set of conditions are met. The central workflow engine interprets events from apps, matches them with existing workflows, and starts a given workflow if the trigger conditions are met. The workflow engine executes workflows on every change to apps or items within workflow-enabled apps as specified by the workflow triggers.

The workflow subsystem can increase productivity by automating tasks that may have previously required manual processes. A key difference between the workflow subsystem and other workflow engines is the unique integrated experience that allows users to build combinations of custom made data-structures and custom workflows, within the application platform, all from a familiar and consistent user experience. Workflows are also hooked into the platform, enabling sharing of information in an open and transparent social context. The social and integrated experience is unique and provides a full solution for users to store data and provide a fully automated workflow around the data. Essentially the workflow subsystem provides a new visual business process language that allows non-technical people to specify actions within business processes running on the platform.

More specifically and formally, the present description is directed to an online collaborative work platform that includes:

a set of first subsystems co-operatively providing a project-oriented social network environment in which a plurality of system users collaboratively interact with user-defined application objects, the first subsystems including commenting, task and status subsystems providing corresponding multi-user functions with respect to the application objects, the application objects storing user data and user-determined application functions executed in the social network environment to display the user data and interlink the application objects into project-scale organizations; and a second subsystem being a workflow subsystem including a workflow builder and a workflow engine, the workflow builder providing a visual interface enabling a user to define custom workflows for the application objects, a workflow being a cause-effect structure identifying a trigger event of an application object that causes the workflow to be executed and defining an action performed on or by an application object in response to the trigger event, the workflow engine receiving system events and executing workflows having corresponding triggers.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
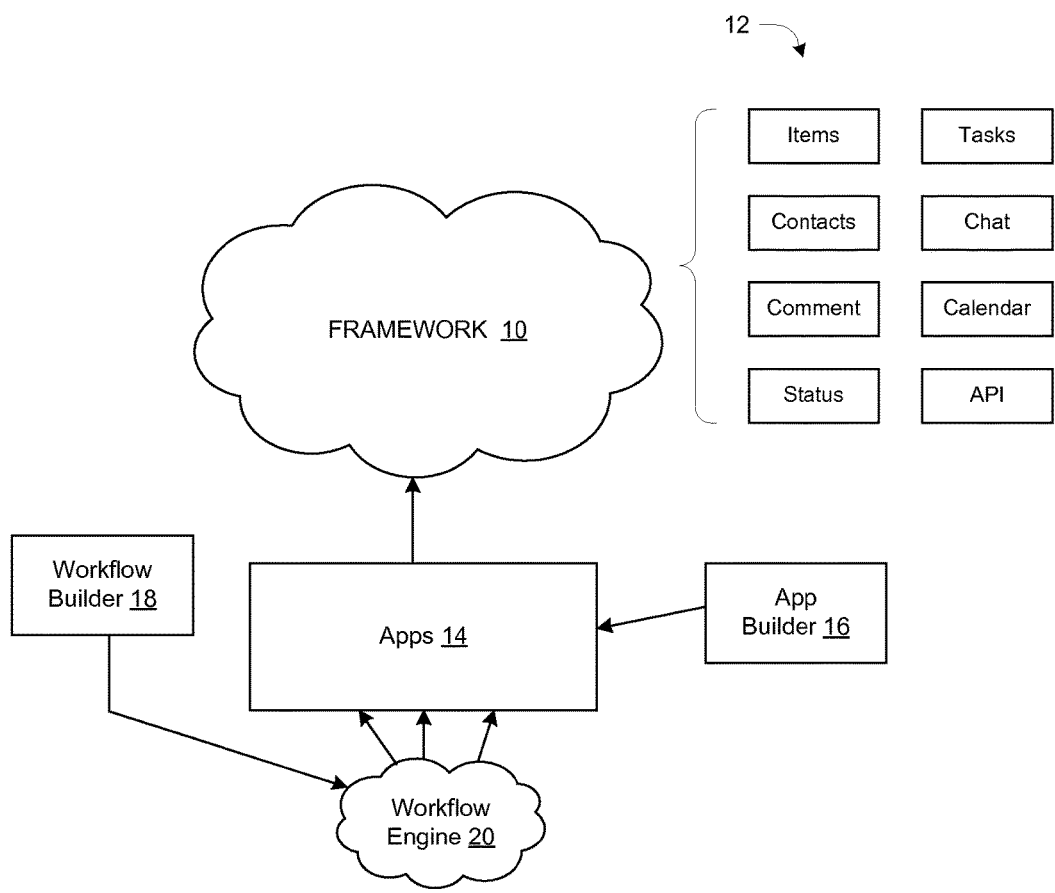
FIG. 1 is a block diagram of an app-based collaborative workspace system.

FIG. 1 is a block diagram of the online collaborative workspace system or platform. A platform framework 10 includes several standard subsystems 12 including Items, Contacts, Comment, Status, Tasks, Chat, Calendar and API (application programming interface) as shown. Those skilled in the art will recognize these as basic features of a social networking system, and examples of some of these are described below. An Apps subsystem 14 is responsible for creation and use of user-defined structures called "apps", created using a tool shown as an app builder 16. An app generally includes user data content as well as other user-specified information, such as presentation information, links to other apps, etc. For any given project or activity, referred to as a "workspace" herein, a set of apps 14 and their interrelatedness forms an extended data set or model on which individuals are collaboratively working. Again, examples are given below.

The system includes two workflow-related components shown as a workflow builder 18 and a workflow engine 20. The workflow builder 18 is used to create workflows, and the workflow engine 20 is responsible for executing the workflows in the context of user access and use of apps 14 during regular operation of the system.

FIG. 1 is a functional block diagram. The system can be realized using one or more computers executing software, and that the various functional blocks of FIG. 1 correspond to computers executing corresponding specialized programs, modules, etc., for the subsystems (e.g., modules related to storing, displaying, and generally managing user contacts for the Contacts subsystem). A computer includes instruction processing circuitry, memory, and interface circuitry connected together by one or more data buses, and in operation the software is stored in the memory, retrieved from the memory and executed by the processing circuitry, with I/O operations including secondary-storage access and network/user communications occurring via the interface circuitry. The system typically has a client-server organization, in which the user-interface functions are performed at user machines such as PCs, smart devices, etc., and more centralized functionality is provided by servers computers communicating with the user machines via a data network, which may include the public Internet for example.

FIGS. 2-6 illustrate certain general functionality of the system with reference to screens of a graphical user interface (GUI) presented to a user during operation.

Figure 2:
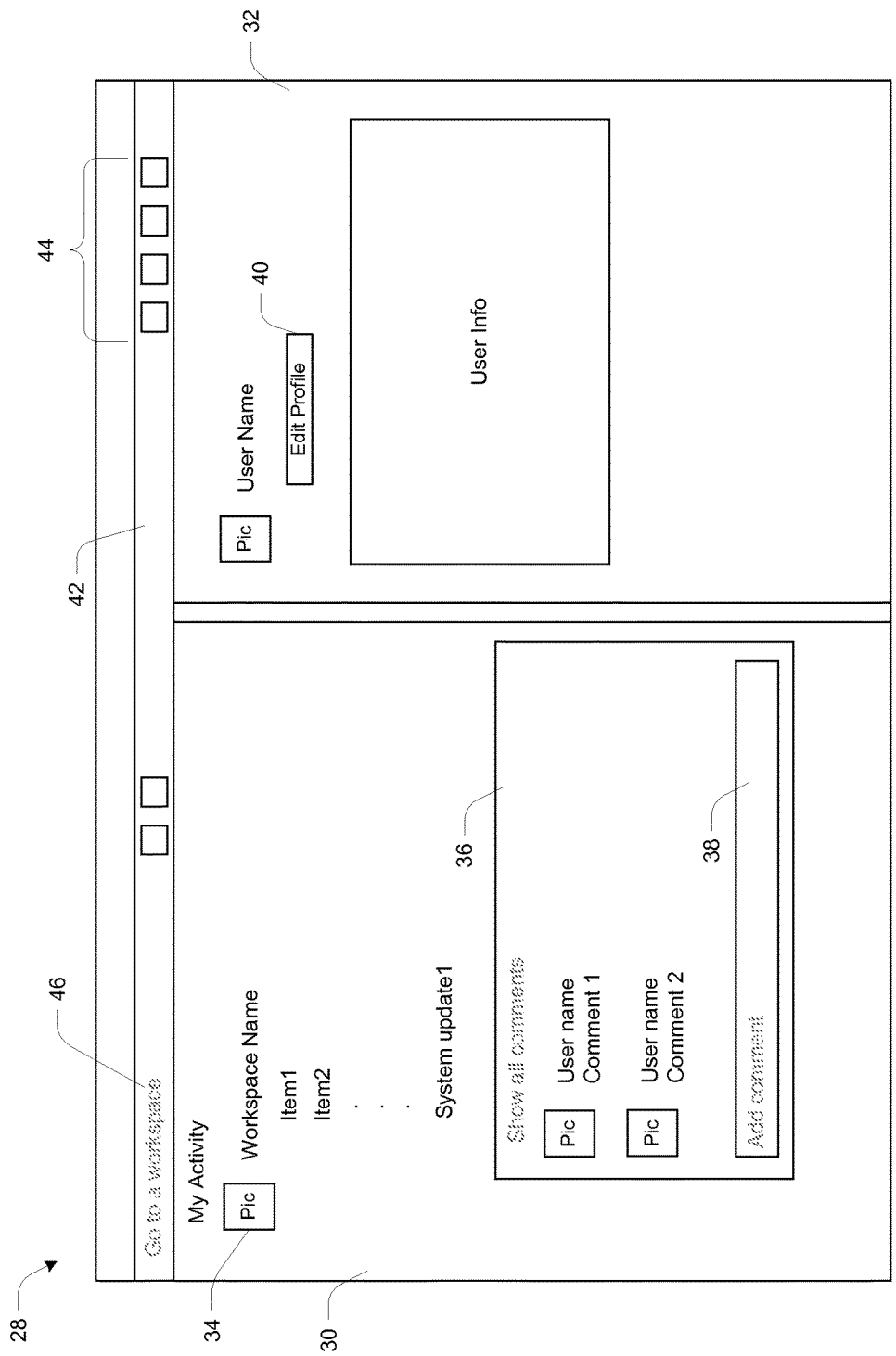
FIGS. 2-12 are schematic depictions of user interface display screens presented to a user during operation of the system.

FIG. 2 shows an example user landing page 28 that may be displayed to a user upon completing a system login process. This is an "activity" screen displayed to a user upon accessing the system, and it presents information about recent activity of this and other users in workspaces in which this user participates.

An activity section 30 shows a recently accessed workspace by title ("Workspace Name" in this abstracted example) along with a picture (Pic) 34 of the system user who created or currently owns the workspace. Also shown are items Item1, Item 2, . . . such as diagrams, documents, etc. that are stored as part of the workspace. Further down are system-generated messages, shown in one example as "System update 1", that are generated in response to activity of the users in the workspace. An example message might be "User X uploaded a new document" along with a time at which that activity occurred. The message might contain hyperlinks to enable a user to easily navigate to the activity, the posting user, and/or the added item. Also shown in this example is a comments section 36 that presents recently added comments (each identifying the commenting user including picture) and that includes an area 38 that the present user uses to add a new comment.

A user information section 32 presents information about the present user, such as a picture, user name, and other information. A control button 40 enables the present user to modify the set of information that the system maintains about himself, known as the user's "profile".

An upper control bar 42 includes several general controls 44, such as Help, Account, Search, etc. It also includes at left a control (hyperlink) 46 for navigating to a "workspace" or project, which is one unit of organization for collaboration. Workspaces are sub-areas, having essentially all the functionality of the system but in a particular project context. Among other things, a workspace organization can provide a focal point for activity as well as things like authorizations and access controls.

Figure 3:
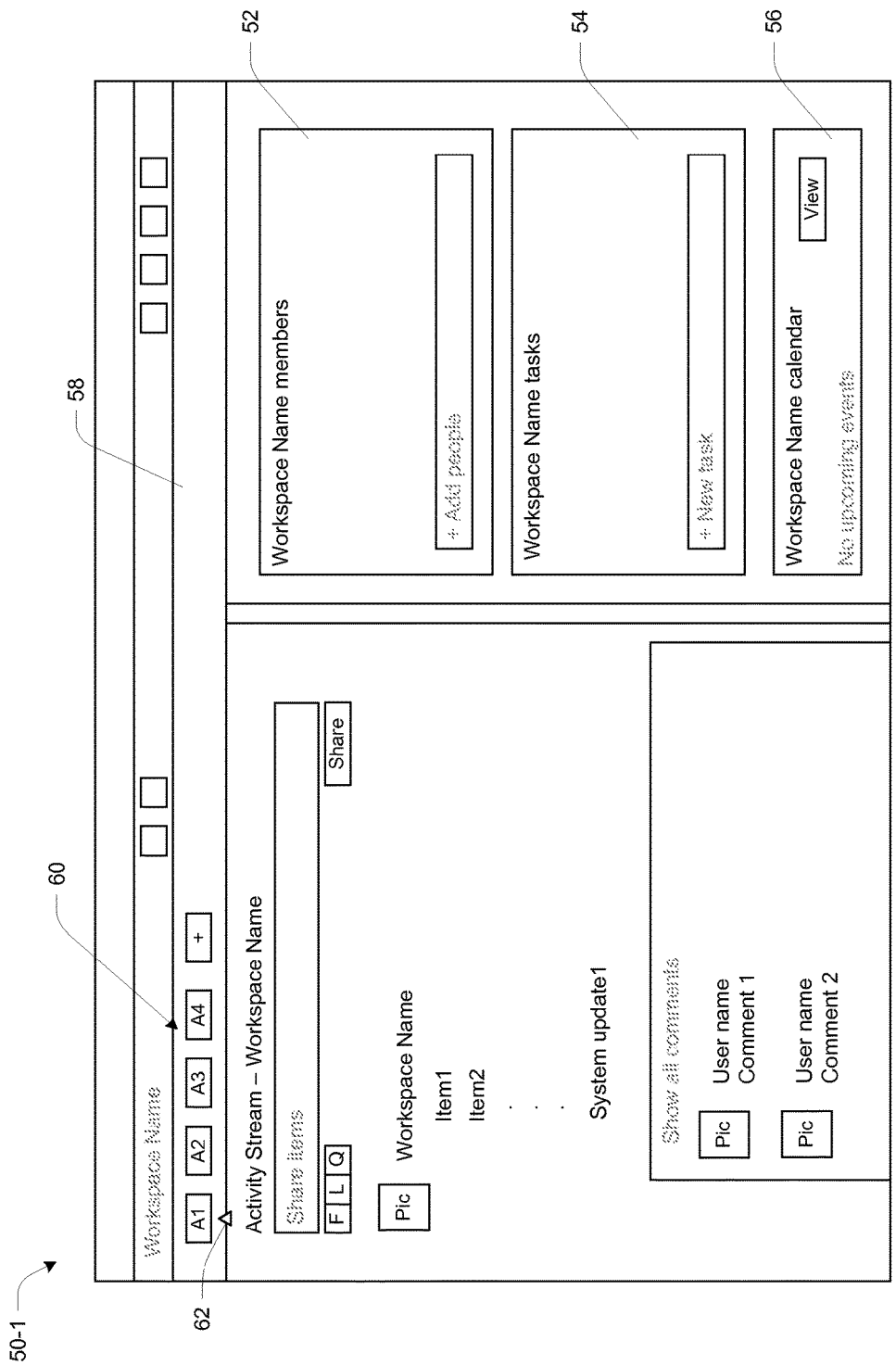

FIG. 3 shows a screen 50-1 for an example workspace called "Workspace Name". This is an initial activity screen, similar in style and function to the system-level screen 28 of FIG. 2. It includes workspace-specific items such as an identification of members 52, listing of tasks 54, and a calendar 56. A second bar 58 shows activation buttons 60 for apps in this workspace (in this example shown as apps A1-A4 and "+"). Some are commonly used apps that may be provided from a library or "app store", such as Activity, Assets, etc. It will be appreciated that the content of the display screen 50 of FIG. 3 is itself a product of the execution of an Activity app. There may also be more customized or user-defined apps, such as an app called "Rough Designs" for storing in-progress design work. The app labelled "+" is for adding a new app, i.e., invoking the app builder 16 (FIG. 1) to create a new app. A triangle or similar pointer 62 indicates which app 60 is currently displayed, which in the case of FIG. 3 is the "A1" or Activity app.

Figure 4:
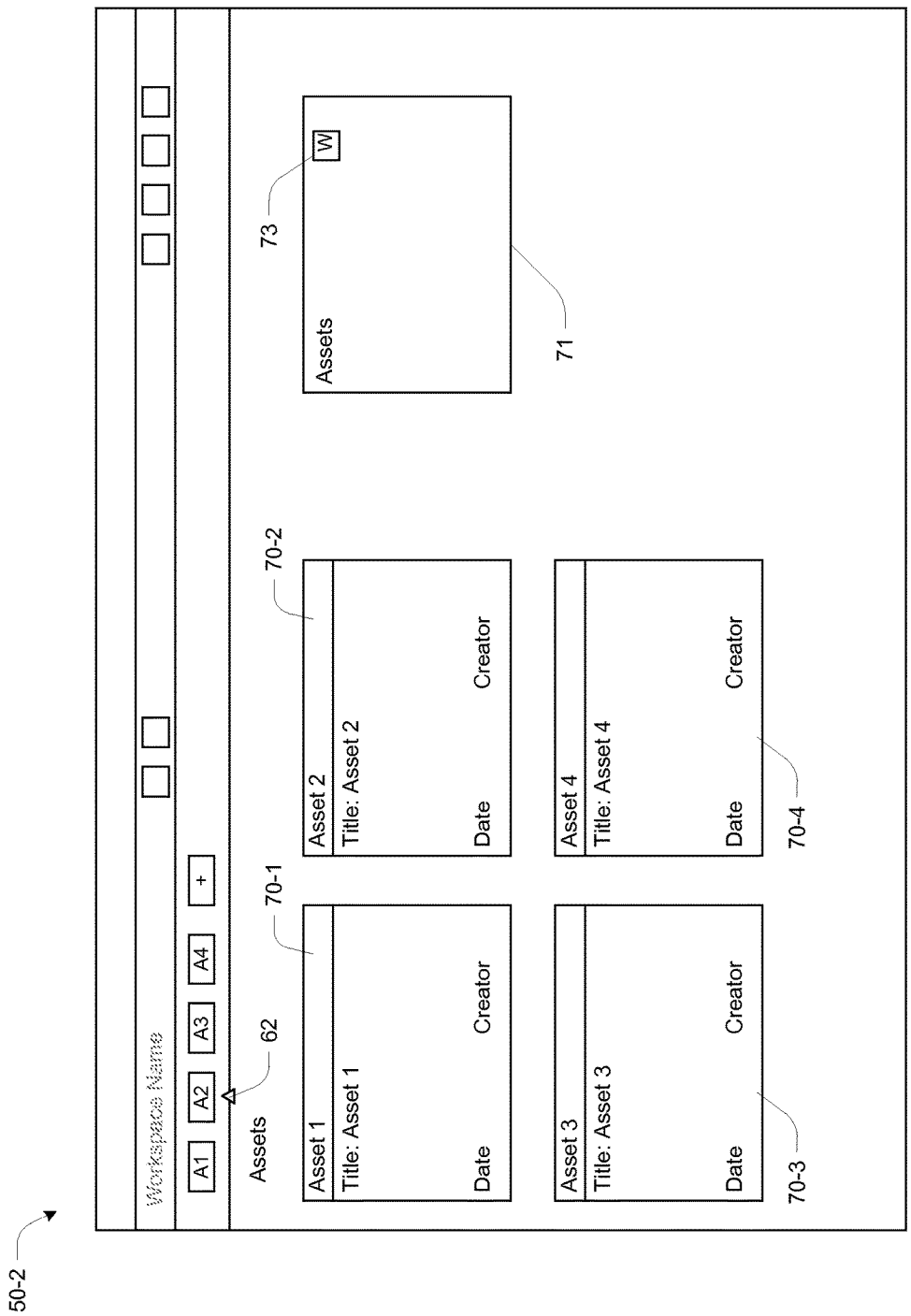
Figure 5:
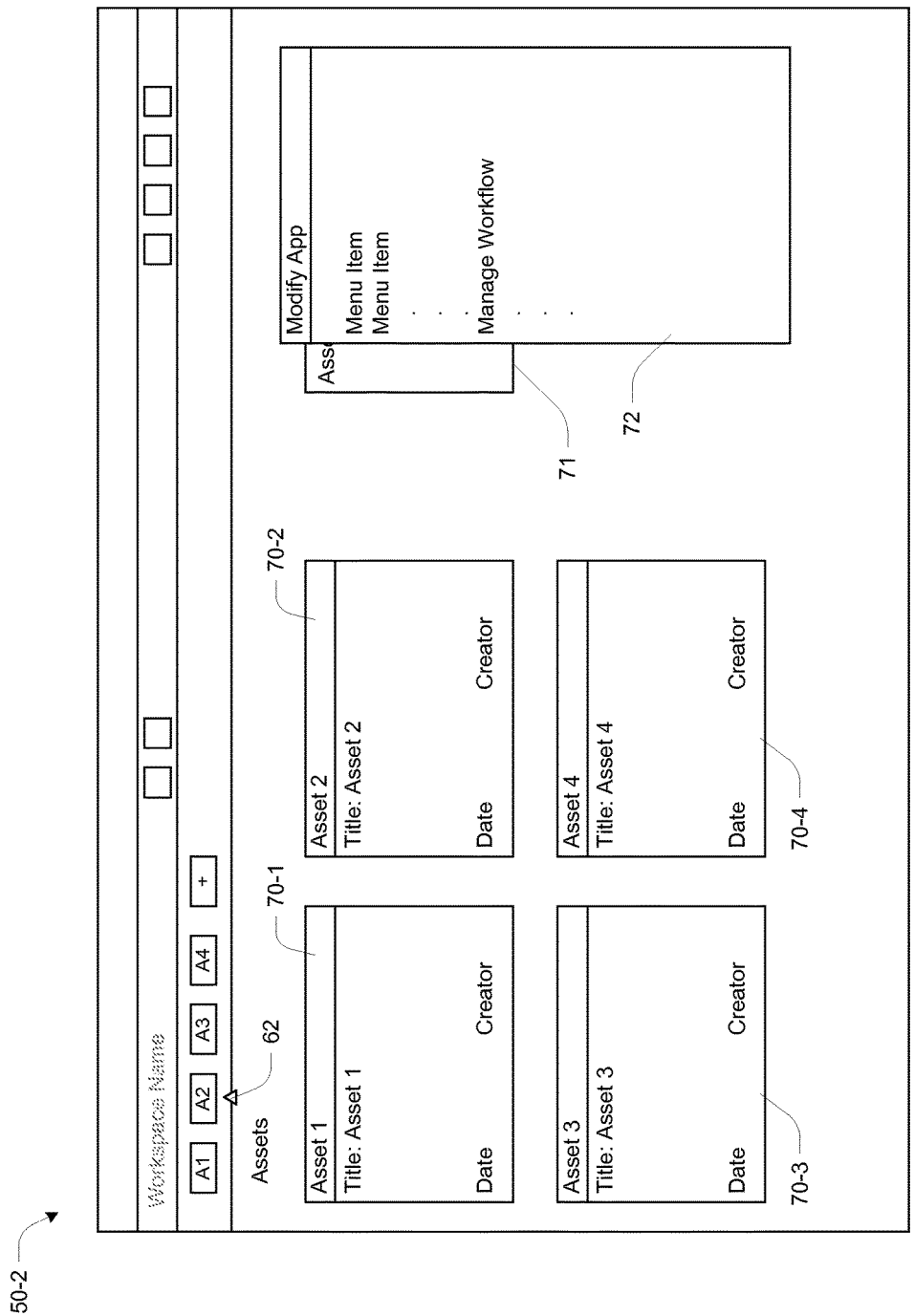

FIG. 4 shows an example screen 50-2 for an Assets app (shown as A2 and indicated by placement of pointer 62), showing items called "assets" forming part of the workspace. The assets are shown as tiles 70-1, 70-2, etc. On the right is an area 71 where certain actions can be performed. In particular, a user-activated wrench (W) icon 73 can be used to obtain a "modify app" pop-up menu, which is shown at 72 in FIG. 5. Example actions are indicated generically as "Menu Items". One specific action is "Manage Workflow", which is used to initiate a new workflow, i.e., to invoke the workflow builder 18. An example using this action is described below.

Figure 6:
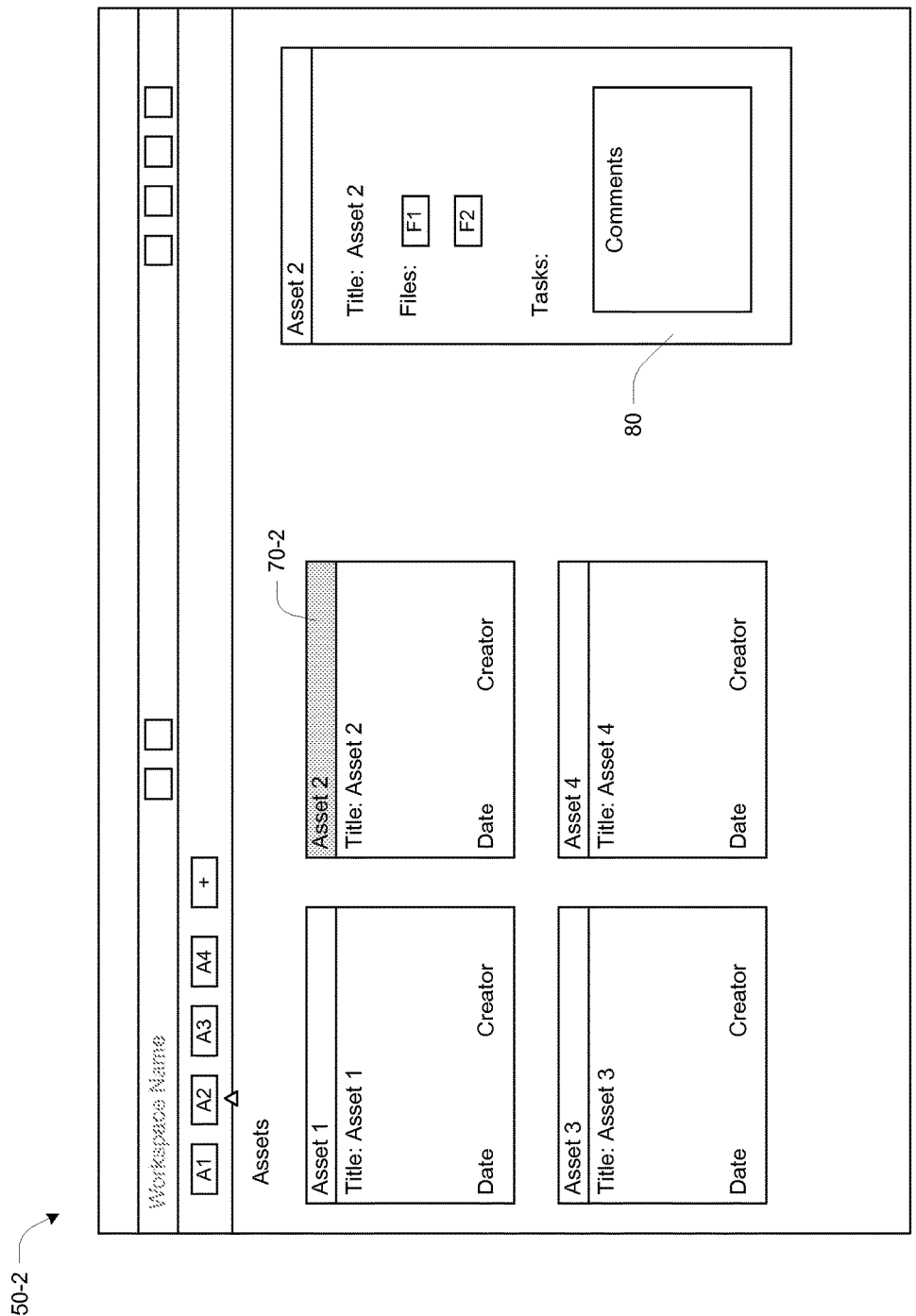

FIG. 6 shows the screen 50-2 in a slightly different state of use, namely a state in which Asset 2 70-2 has been selected by the user. At right is an area 80 for showing information and activity for this asset. These include an asset Title, contents in the form of Files F1, F2, any Tasks, and Comments.

FIGS. 7-10 provide an example of operation of the workflow builder 18 of FIG. 1. It is assumed that the workflow builder 18 is launched with Asset 2 selected (see FIG. 6), so that the new workflow will pertain to that asset. The workflow builder 18 may be launched in one example by user selection of the "Manage Workflow" item from the menu 72 of FIG. 5.

Figure 7:
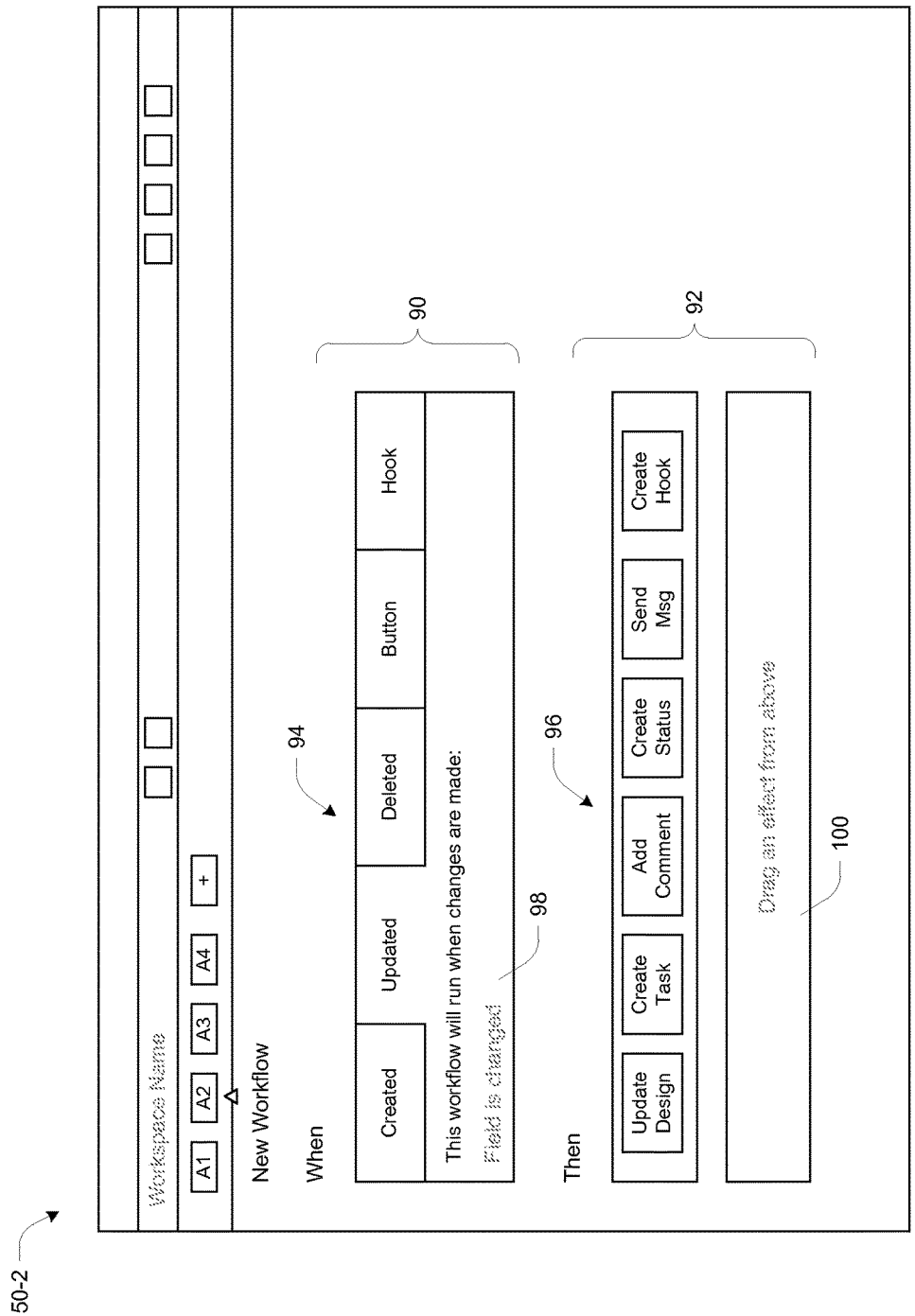

FIG. 7 shows a workflow definition screen displayed upon user selection of the Manage Workflow function. The screen has two basic areas corresponding to the "cause" and "effect" nature of a workflow—these are shown as When (cause) area 90 and Then (effect) area 92. In this example, several candidate When items (causes) and Then items (effects) are shown as corresponding icons 94, 96. Workflows are created by selecting a When item 94 and then taking additional action in a When selection area 98 (see example below), and dragging at least one Then item 96 into a Then selection area 100.

Figure 8:
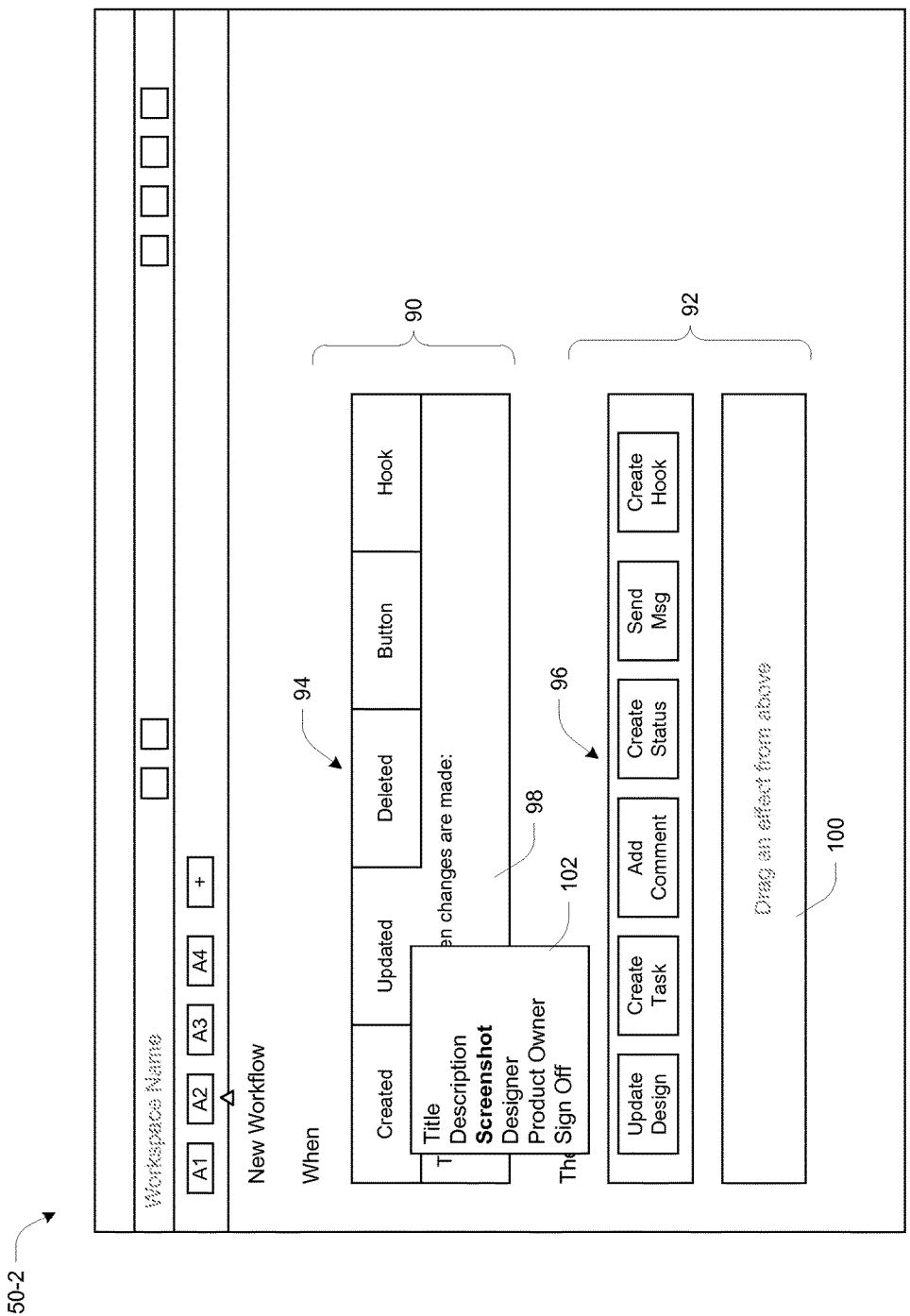
Figure 9:
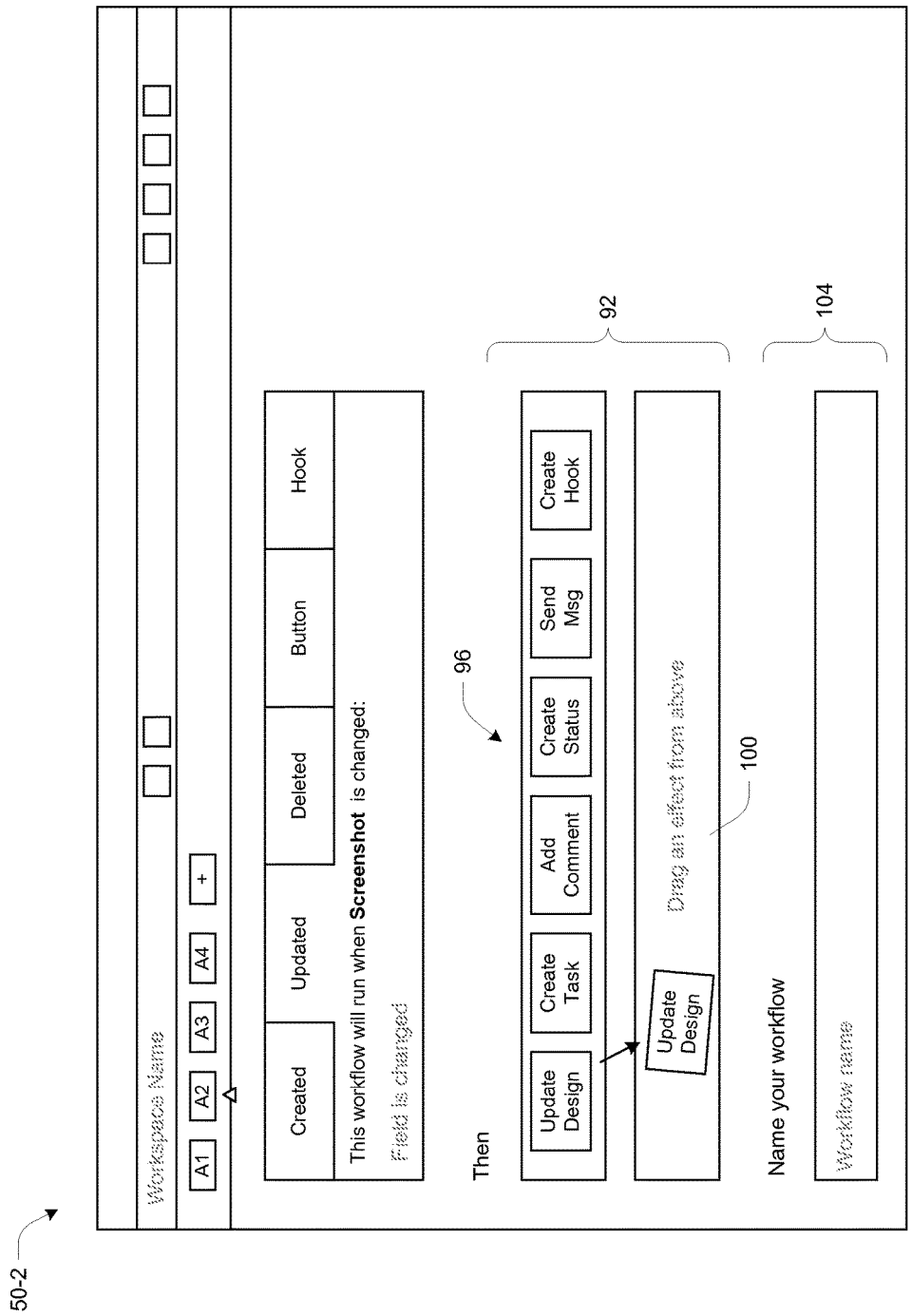
Figure 10:
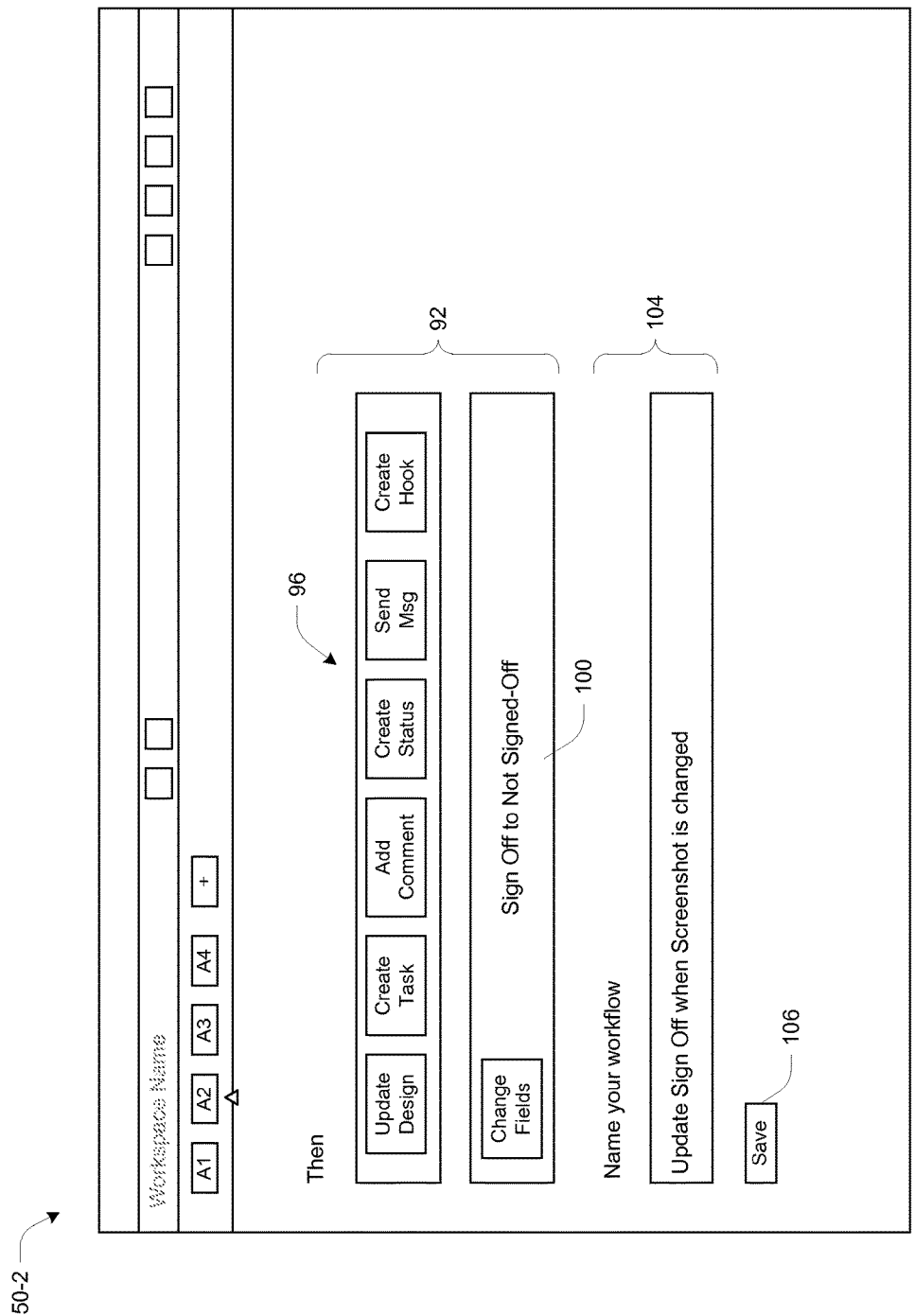

FIG. 8 shows the automatic presentation of a selection menu 102 in response to the user placing the screen cursor in the selection area 98 (FIG. 7) when the Updated cause 94 is selected. Also indicated by bolding is user selection of a Screenshot menu item indicating that this workflow is triggered when the screenshot (image) for Asset 2 is changed. FIG. 9, showing the screen scrolled down slightly, shows the user selecting an "Update Design" effect by dragging that effect icon 96 to the Then selection area 100. This organization easily supports multiple effects, simply by dragging multiple different effect icons 96 to the Then selection area 100. In FIG. 10, the user has released the Update Design icon and has selected a "change fields" option from an automatically presented menu (not shown), and in this example the selected option specifies that the effect is to change a Sign Off status of the asset to "Not Signed-Off". There is also an area 104 for naming the workflow, and a Save button 106 for saving it.

Figure 11:
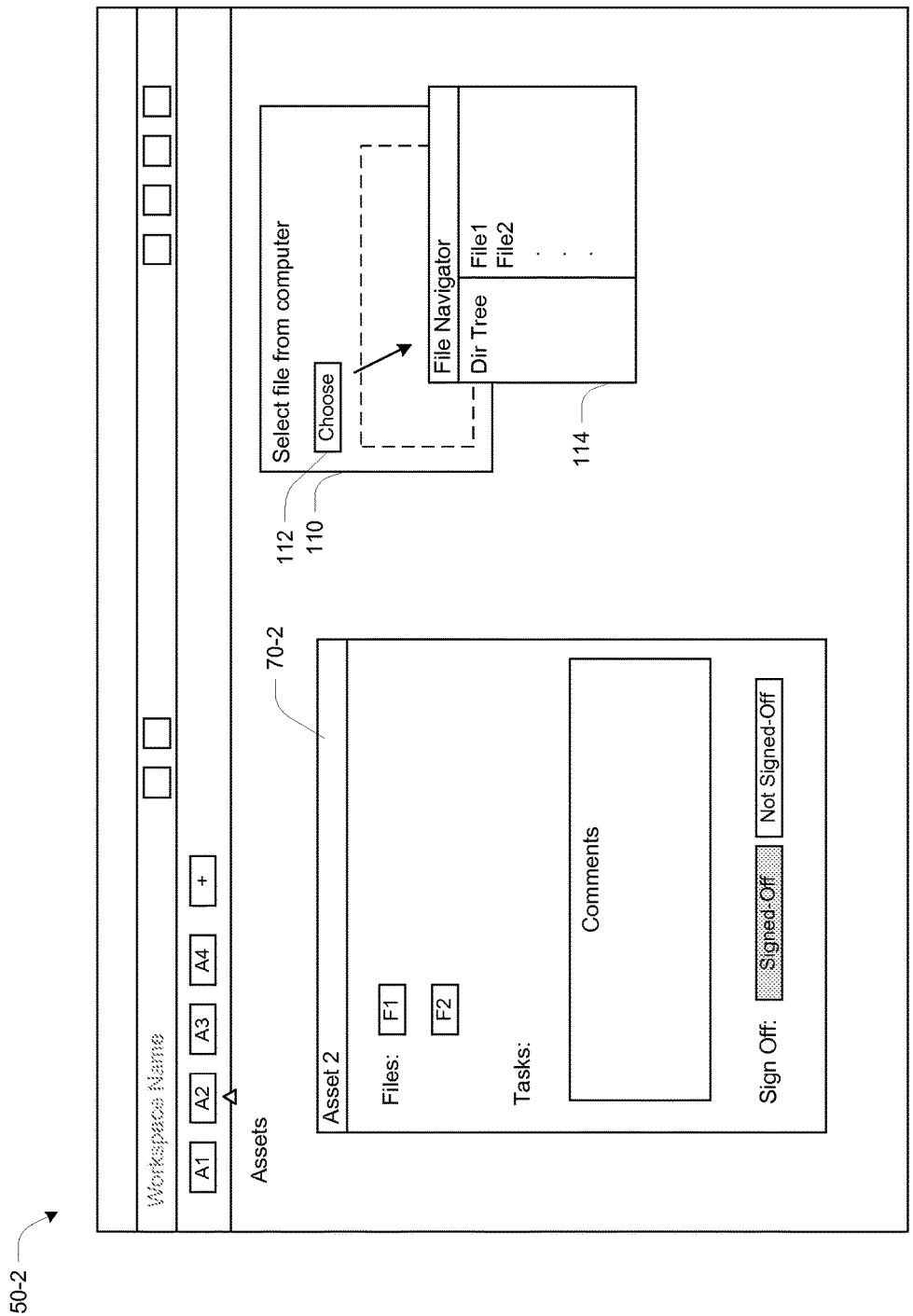
Figure 12:
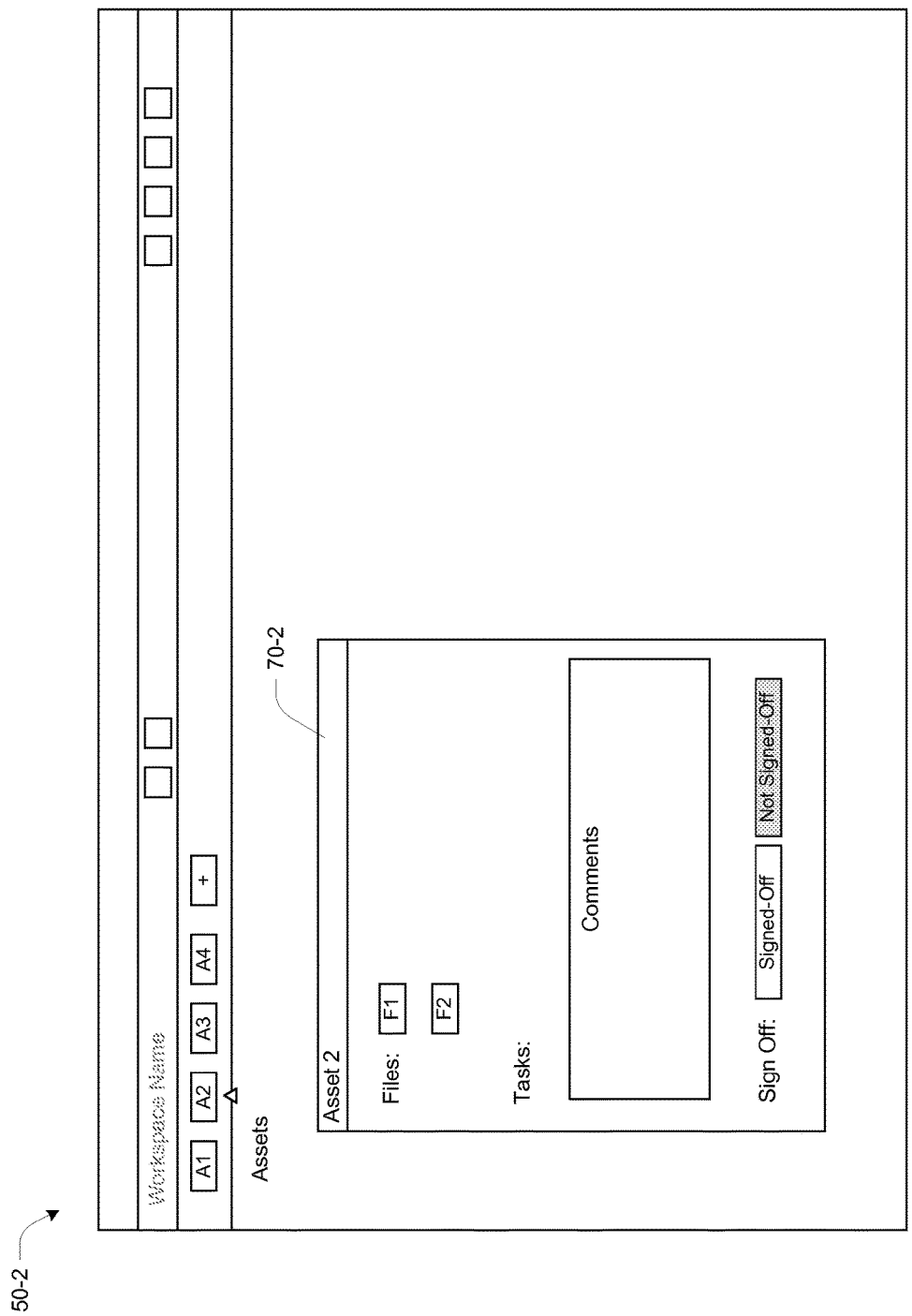

FIGS. 11-12 illustrate the functioning of the new workflow during user manipulation of the related app, in this case the Asset 2 app. Asset 2 is shown at bottom as having an initial Sign Off status of "Signed-Off". The user will have gotten to this stage by first selecting the Asset 2 app and then selecting a control for modifying it (see related example above with reference to FIG. 5). Specifically, the user is changing the image, and the control in this case is a dialog box 110 "Select file from computer". Upon the user activating a "Choose" button 112, a file navigator 114 of the local operating system is presented to enable the user to select an image file from the file system contents (options shown as File 1, File 2 etc.). By just this part of the operation, the newly selected image will be presented when displaying Asset 2 going forward. FIG. 12 shows another result from this change—the Sign Off status is now shown as Not Signed-Off. This has occurred by automatic action of the workflow engine 20 (FIG. 1) according to the new workflow described above. In particular, the workflow engine 20 has monitored for the modification of the Asset 2 screenshot as a trigger, then taken the action(s) specified by the Then portion of the workflow (in this example, setting the Sign Off status to Not Signed-Off). This action has occurred automatically in response to the user's changing of the screen shot, with no separate user involvement required.

Figure 13:
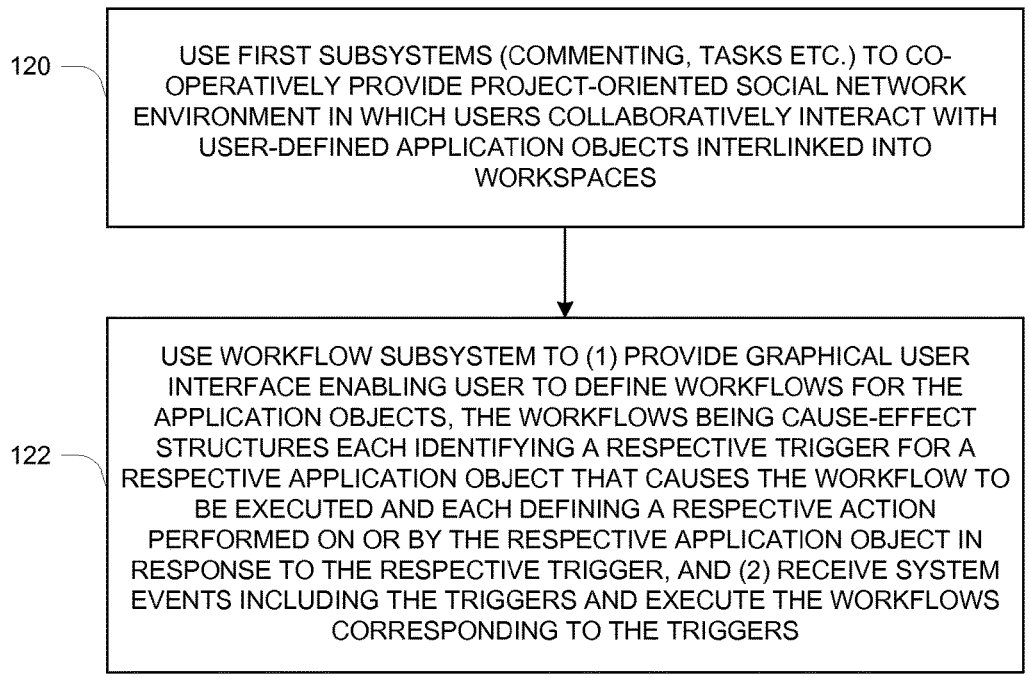
FIG. 13 is a high-level flow diagram of pertinent operation of the system.

FIG. 13 provides a high-level flow of system operation. At 120, a set of first subsystems is used to co-operatively provide a project-oriented social network environment in which a plurality of system users collaboratively interact with user-defined application objects. The first subsystems can provide multi-user functions such as Commenting, Tasks, Status, etc. with respect to the application objects. The application objects store user data and user-determined application functions executed in the social network environment to display the user data and to interlink the application objects into project-scale organizations.

At 122, a workflow subsystem is used that includes a workflow builder and a workflow engine. The workflow builder provides a graphical user interface enabling a user to define workflows for the application objects. The workflows are cause-effect structures each identifying a respective trigger for a respective application object that causes the workflow to be executed and each defining a respective action performed on or by the respective application object in response to the respective trigger. The workflow engine receives system events including the triggers and executes the workflows corresponding to the triggers.

Various other causes/triggers and effects/actions may be used in workflows. Additional non-exclusive examples of each are given below.

Causes/Triggers:
Item was created
Item was updated/item field value was changed
Item was deleted
App was updated (i.e. structure of app was changed)
Button pressed (i.e. manual start of the workflow by means of pressed a button on UI of the item display)
Webhook received/notification from third party service to start the flow Effects/Actions:
Create task
Create comment
Change item field value
Create a new item
Create status message
Send private message
Execute webhook/notify third party service
Share item with external people Also, an effect/action may include triggering another workflow, and thus individual smaller workflows can be chained into larger, more complex and more comprehensive workflows.

A workflow may also be designed to use one or more values from the item itself in the effects. An example can be described as follows: "When the value of the status field changed, create a task for the person who is the Designer (the value of the Contact field)". This functionality enables a useful level of abstraction so as to provide consistent operation when certain specifics of the item are subject to change, for example.

Figure 14:
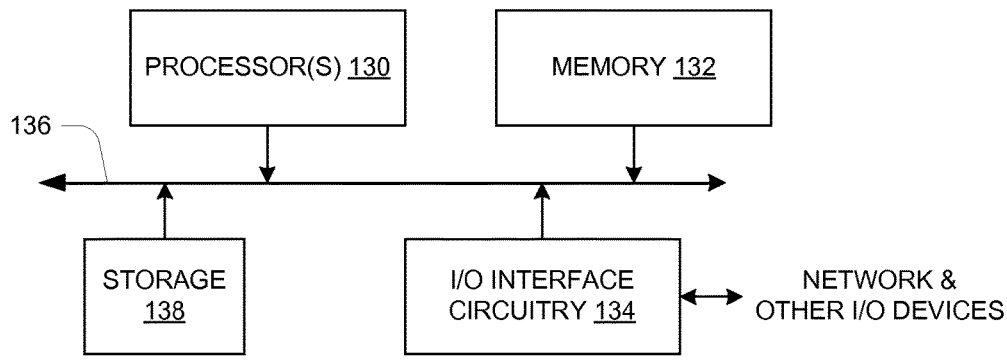
FIG. 14 is a schematic block diagram of a computer.

FIG. 14 shows an example configuration of a physical computer from a computer hardware perspective, which may be used to realize a hardware portion of the system. The hardware includes one or more processors 130, memory 132, and I/O interface circuitry 134 interconnected by data interconnections 136 such as one or more high-speed data buses. The I/O interface circuitry 134 provides a hardware connection to a network and perhaps other external devices/connections (EXT DEVs). The processor(s) 130 with connected memory 132 may also be referred to as "processing circuitry" herein. There may also be local storage 138 such as a local-attached disk drive or Flash drive. In operation, the memory 132 stores data and instructions of system software (e.g., operating system) and one or more application programs which are executed by the processor(s) 130 to cause the hardware to function in a software-defined manner, such as described above. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

While various embodiments of the invention have been particularly shown and described, it will be understood by those skilled in the art that various changes in form and details may be made therein without departing from the scope of the invention as defined by the appended claims.

What is claimed is:

1. A computer-based online collaborative work system, comprising:
    a set of first subsystems being one or more computers executing corresponding programs, the first subsystems co-operatively providing a project oriented social network environment in which a plurality of system users collaboratively interact with user-defined application objects, the first subsystems including commenting, tasks and status subsystems providing corresponding multi-user functions with respect to the application objects, the application objects storing user data and user-determined application functions executed in the social network environment to display the user data and to interlink the application objects into project-scale organizations forming extended data sets of respective workspaces on which individual users are collaboratively working, the first subsystems being configured and co-operative to:
        display the application objects to a user using a first screen of a graphical user interface in which the user views, selects and initiates operations on the application objects;
        receive a selection of an application object from the user via the first screen; and
        in response to user initiation via the first screen, perform an object modification operation on the selected application object under control of the user, the object modification operation including an invocation of a workflow builder to create a new workflow for the selected application object; and
    a second subsystem being one or more computers executing a corresponding program, the second subsystem being a workflow subsystem including a workflow builder and a workflow engine, the workflow builder responding to user input via a second screen of the graphical user interface to create the new workflow for the selected application object, the new workflow being a cause-effect structure identifying a trigger that causes the new workflow to be executed and defining a user-specified automated action performed upon the selected application object in response to the trigger, the workflow engine performing workflow operations of (a) receiving system events including the trigger, (b) interpreting the system events as respective triggers and matching them with corresponding existing workflows, and (c) executing workflows based on changes made to the application objects as specified by the respective triggers, the workflow operations including, upon occurrence of the trigger, executing the new workflow to perform the user-specified automated operation upon the selected application object.

2. The computer-based online collaborative work system according to claim 1, wherein the set of first subsystems further includes an application builder subsystem for creating the application objects.

3. The computer-based online collaborative work system according to claim 1, wherein the second screen is a When-Then screen having a When section and a Then section, the When section configured to enable the user to specify a trigger for a workflow, the Then section configured to enable the user to specify an action to be performed as part of the workflow in response to the trigger.

4. The computer-based online collaborative work system according to claim 3, wherein the When section includes first tiles representing potential triggers and a first area into which the user can drag a first tile to specify an actual trigger for the workflow, and wherein the Then section includes second tiles representing potential triggers and a second area into which the user can drag a second tile to specify an actual action for the workflow.

5. The computer-based online collaborative work system according to claim 4, wherein the Then section is configured to enable the user to drag multiple second tiles into the second area to specify multiple actions for the workflow.

6. The computer-based online collaborative work system according to claim 3, wherein the automated action to be performed for the workflow is triggering a separate workflow.

7. The computer-based online collaborative work system according to claim 3, wherein the When section is configured with a set of potential triggers from which the user selects the trigger, the set of potential triggers including creation, deletion, updating, and activating of an application object.

8. The computer-based online collaborative work system according to claim 1, wherein the workflow builder is activated from within an application displaying the selected application object.

9. The computer-based online collaborative work system according to claim 8, wherein the application is activated from a workspace landing page presented to a user when the user accesses a workspace of the project-oriented social network environment, the workspace landing page including other workspace-specific applications including activity, people, tasks and calendar applications for corresponding activity and information of the workspace.

10. The computer-based online collaborative work system according to claim 9, wherein the workspace landing page is selected from a user landing page presented to the user when the user logs in to the project-oriented social network environment, the user landing page including other user-specific applications including activity, people, tasks and calendar applications for corresponding activity and information of the user across all workspaces in which the user participates.

11. The computer-based online collaborative work system according to claim 1, wherein:
the first screen of the graphical user interface is a workspace landing page displaying representations of application objects of a workspace; and
the selected application object is identified by a graphical pointer to the representation of the selected application object.

12. A method of operating a computer-based online collaborative work system, comprising:
co-operating a set of first subsystems to provide a project-oriented social network environment in which a plurality of system users collaboratively interact with user-defined application objects, the first subsystems including commenting, tasks and status subsystems providing corresponding multi-user functions with respect to the application objects, the application objects storing user data and user-determined application functions executed in the social network environment to display the user data and to interlink the application objects into project-scale organizations forming extended data sets of respective workspaces on which individual users are collaboratively working, the co-operating of the first subsystems including:
displaying the application objects to a user using a first screen of a graphical user interface in which the user views, selects and initiates operations on the application objects;
receiving a selection of an application object from the user via the first screen; and
in response to user initiation via the first screen, performing an object modification operation on the selected application object under control of the user, the object modification operation including an invocation of a workflow builder to create a new workflow for the selected application object; and
operating a second subsystem as a workflow subsystem including a workflow builder and a workflow engine, the operating of the second subsystem including, (1) by the workflow builder, responding to user input via a second screen of the graphical user interface to create the new workflow for the selected application object, the new workflow being a cause-effect structure identifying a trigger that causes the workflow to be executed and defining a user-specified automated action performed upon the selected application object in response to the trigger, and (2) by the workflow engine, performing workflow operations of (a) receiving system events including the trigger, (b) interpreting the system events as respective triggers and matching them with corresponding existing workflows, and (c) executing workflows based on changes made to the application objects as specified by the respective triggers, the workflow operations including, upon occurrence of the trigger, executing the new workflow to perform the user-specified automated operation upon the selected application object.

13. The method according to claim 12, wherein the set of first subsystems further includes an application builder subsystem for creating the application objects.

14. The method according to claim 12, wherein the second screen is a When-Then screen having a When section and a Then section, the When section configured to enable the user to specify a trigger for a workflow, the Then section configured to enable the user to specify an action to be performed as part of the workflow in response to the trigger.

15. The method according to claim 14, wherein the When section includes first tiles representing potential triggers and a first area into which the user can drag a first tile to specify an actual trigger for the workflow, and wherein the Then section includes second tiles representing potential triggers and a second area into which the user can drag a second tile to specify an actual action for the workflow.

16. The method according to claim 15, wherein the Then section is configured to enable the user to drag multiple second tiles into the second area to specify multiple actions for the workflow.

17. The method according to claim 14, wherein the automated action to be performed for the workflow is triggering a separate workflow.

18. The method according to claim 14, wherein the When section is configured with a set of potential triggers from which the user selects the trigger, the set of potential triggers including creation, deletion, updating, and activating of an application object.

19. The method according to claim 12, wherein the workflow builder is activated from within an application displaying the selected application object.

20. The method according to claim 19, wherein the application is activated from a workspace landing page presented to a user when the user accesses a workspace of the project-oriented social network environment, the workspace landing page including other workspace-specific applications including activity, people, tasks and calendar applications for corresponding activity and information of the workspace.

21. The method according to claim 20, wherein the workspace landing page is selected from a user landing page presented to the user when the user logs in to the project-oriented social network environment, the user landing page including other user-specific applications including activity, people, tasks and calendar applications for corresponding activity and information of the user across all workspaces in which the user participates.

* * * * *